United States Patent Office 2,984,537
Patented May 16, 1961

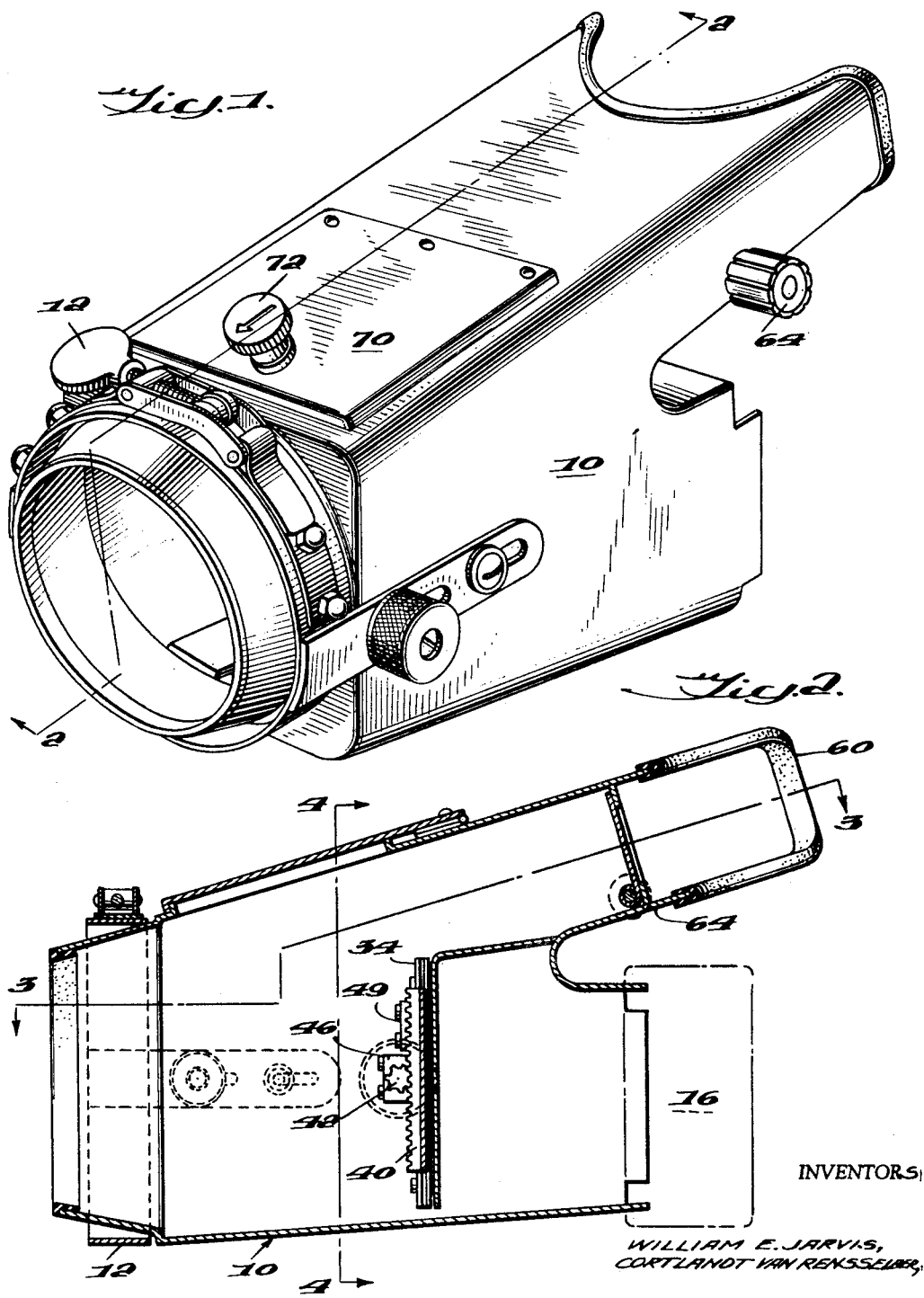

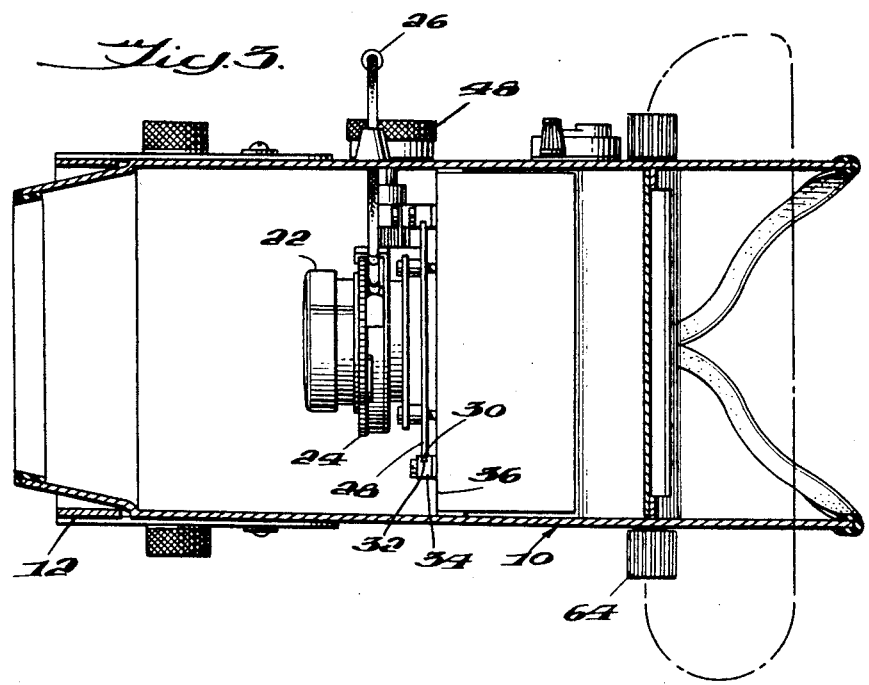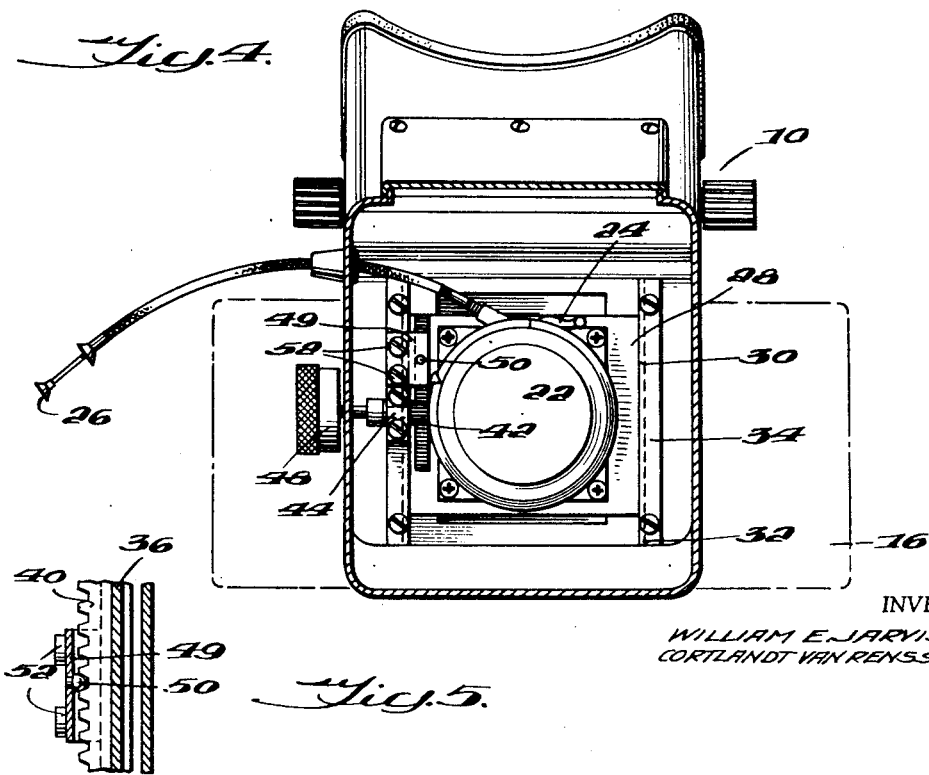

2,984,537
CATHODE RAY OSCILLOSCOPE CAMERA

William E. Jarvis, Palo Alto, and Cortlandt van Rensselaer, Los Altos, Calif., assignors to Hewlett-Packard Company, Palo Alto, Calif., a corporation of California Filed Aug. 31, 1959, Ser. No. 837,244

5 Claims. (Cl. 346—110)

The invention relates to a cathode ray tube oscilloscope camera, and more particularly relates to an improved method and apparatus for obtaining multiple pictures of the face of the oscilloscope by means of controlled motion of the lens of a camera to achieve successive exposures on the same film.

In existing oscilloscope cameras, multiple pictures may be obtained by means moving vertically the back of the camera or the film holder, and thus obtain successive exposures on a same piece of film. Specialized lens systems were developed and gradually refined to adapt to standard cameras to the specialized art of taking pictures of scope traces. Developments of Polaroid Land film, a product sold under the registered trademark Polaroid of Polaroid Corporation, Cambridge, Massachusetts, proved to be a boon for the scope camera business since data is adaptable to being examined almost immediately. The Polaroid Land process has reduced the time required for obtaining permanent data to approximately one minute. Minute changes in the scope rays can be photographed and analyzed. The results of variable intensity modulation levels are easily viewable in a photograph.

A photograph is almost indispensable in studying non-repetitive transients since the mind has difficulty in remembering all of the variations present in a typical scope ray, and then trying to sketch or record them. Many of these transients are so fast that they are almost invisible to the human eye.

Probably the most important single item necessary for high quality photographs is the lens of the camera. Lens re normally specified as to the focal length and $f$ number. The focal length remains fixed and is the distance of the focus from the surface of the lens. The $f$ number expresses the effectiveness of the aperture in relation to the brightness of the image. The $f$ number is obtained by dividing the focal length by the effective diameter of the lens. Thus, a lens having a focal length of 3 inches and a diameter of 1.6 inches is an $f$ 1.9 lens. The lower the $f$ number, the brighter the image, and hence a shorter time is required for the exposure. For a given aperture ($f$ number) there is a given depth of field or focus. Because of cathode ray tube construction and graticule placements, there is a $3/16$ inch difference between the plane containing the phosphorescent trace on the interior of the tube and the plane containing the graticule on the exterior of the tube. Generally, as the aperture is decreased, the depth of field is increased to result in substantially perfect focus of the trace and the graticule.

Therefore it is an object of the invention to provide a device to produce large undistorted pictures on standard type film with no missing information.

Also, it is an object of the invention to provide multiple number of pictures per film by means of a spring and ball detent mechanism for assisting therein.

It is a further object of the invention to provide an oscilloscope camera having "two eye" viewing apparatus usable by operators, including those with eyeglasses.

It is a further object of the present invention to provide a simpler mounting arrangement for an oscilloscope camera and provide a lighter weight instrument.

It is another object of the invention to provide an oscilloscope camera without inverted images and a reduced writing rate caused by dichroic beam splitting.

It is still another object of the invention to provide the elimination of light leakage.

It is still another object of the present invention to provide an oscilloscope camera having a fixed back for the camera, and having an easy and positive locking clamp mechanism so there is no fear of the camera falling off of the oscilloscope when pulling the film tabs of the camera.

It is a further object of the present invention to provide a movable lens coupled to a standard camera bellows for an oscilloscope camera to eliminate light leakage problems.

It is a further object of the present invention to provide an adjustable clamping mechanism that provides or permits easy mounting of the camera on any oscilloscope.

It is a further object to provide in an oscilloscope camera, a convenient access door to enable the setting of the lens openings and shutter speeds even with the camera mounted on the oscilloscope.

A further object of the invention is to provide a built-in timer to enable or provide an operator with time development cycles and calculated long exposures.

It is a further object of the invention to provide a camera for an oscilloscope that has a good supporting system and a positive solution to the multiple picture problem, and having a camera not using a dichroic mirror arrangement, an eluded image, nor having a focusing problem due to the fact that the focus is calculated from the front panel as a reference plane.

A further object of the invention is to provide a bellows to eliminate light leakage and simplify multiple exposure procedures since a convenient knob moves a lens through a plurality of detented positions while the camera back remains securely fixed.

Other objects and advantages will be apparent from a detailed description of the invention and from the appended drawings and claims.

In the drawings:

Fig. 1 is a perspective view of the cathode ray oscilloscope camera in accordance with a preferred embodiment of the present invention;

Fig. 2 is a side elevation view in cross-section of the oscilloscope camera of Fig. 1;

Fig. 3 is a top view in cross-section of the oscilloscope camera taken along lines 3—3 of Fig. 1;

Fig. 4 is a front elevation view in cross-section of a portion of Fig. 2 taken along lines 4—4 showing the rack, pinion, and ball-detent device in accordance with the preferred embodiment of the invention; and Fig. 5 is a detail side elevation view of the ball-detent device, more generally shown in Fig. 2.

Referring now to the drawings, there is shown an oscilloscope camera case 10 having a mounting clamp 12 for holding the camera case in fixed relation to the bezel ring of an oscilloscope (not shown). At the other end of the camera case there is mounted in fixed relation a camera 16, which may be of the Polaroid Land camera type having film for obtaining rapid development thereof after exposure. The camera 16 has a conventional bellows extending from a plate in the camera to a lens head 22.

The bellows prevents light leakage to the interior of the camera. At the end of the bellows positioned away from the camera 16, there is a lens head 22 of conventional design for mounting a conventional lens and a conventional shutter arrangement. The shutter arrangement is operated either by a lever mechanism 24 or a push button 26. The lens head is securely mounted upon a movable lens plate 28 having edges 30 for engaging grooves 32 of fixed members 34. The fixed members 34 are secured to the interior of the camera housing by plate member 36 so that the lens plate may move in a substantially vertical movement or direction.

There is maintained a fixed horizontal distance between all three photographic elements, i.e., the object or trace plane, the lens plate and the image plate (not shown) of the camera 16, and all three of these photographic elements are within the light proof enclosure provided by the camera case.

In order to take multiple exposures of a single film in the camera 16, which exposures are the substantial size of the oscilloscope face within a bezel ring (not shown) of the oscilloscope, there is mounted a rack 40 onto the movable lens plate 36 and adjacent one of the fixed members 34 and parallel therewith for engaging a pinion 42 on a shaft 44. The shaft 44 is rotatably mounted in a block or bearing 46 onto the same fixed member 34. On the exterior end of the shaft 44, there is mounted a knob 48 for turning the pinion in a manner so that the movable lens plate 28 moves throughout its vertical range of movement.

Also mounted on the same fixed member 34 is a spring-loaded resilient plate 49 and a ball bearing detent 50 mounted at the free end thereof. The plate 49 is secured by screws 52 onto the fixed member 34. The ball portion of the detent engages the spacing between the teeth of the rack 40, and the bias of the spring-loaded plate 49 is sufficient to secure the movable plate stationary until the knob is turned to shift the movable plate to another position.

As the rack and pinion 40, 42 move the lens within a plane parallel to the plane of the object on the cathode ray tube face the spring-loaded ball bearing detent 50 engages a space between two of the teeth of the rack 40 and thereby hold the lens plate being fixed to the rack in place. As the knob 48 is turned, the lens is positioned in each position that the detent engages throughout the spaces between the teeth of the rack 40. These positions are ascertainable and also provide audible and manual feel of the detents for reference or record keeping and useful in making photographs. These fixed detents permit accurate and easily re-settable lens positions, and, therefore, provide accurate and easily re-settable image locations. There is no introduction of distortion or other degradation of the picture on the oscilloscope. This is evident because of the fact that there are three parallel planes, the image plane, the object plane, and the plane of motion of the lens. There is optimum focus on a flat plane by the camera. The optimum focus is on the object plane in this case.

In order to provide equally smooth motion in moving the lens upward as well as downward, the weight of the lens may be supported by an extension spring substantially counter-balancing the forces of gravity due to the mass of the lens.

The camera case includes a sight-viewer 60 having a flap for closing and opening the sight-viewer 60. The closing and opening is controlled by a knob 64. When pictures are being recorded the sight-viewer is closed, but when it is desired to know the characteristics of the waveform on the oscilloscope, then the knob 64 is turned to open the sight-viewer so that an operator may observe the waveform.

Also provided is a door 70 and a knob-lock 72 to maintain the door 70 in a closed position.

It should be understood that the specific apparatus or system of elements shown and described herein is intended to be representative only. Reference should be therefore made to the following claims in determining the full scope of the invention.

We claim:

1. A device for taking sequential exposures of objects appearing on an oscilloscope face, comprising a case securely mountable upon the oscilloscope face, a camera having a monomanual vertically adjustable lens, an image plate rigidly positioned upon the case, a rack and pinion arrangement, means securing said arrangement to said camera for adjustably moving the lens into multiple positions along the vertical path, and a ball mounted on a plate for urging the ball within a tooth of the rack for maintaining the lens in a predetermined vertical position, said rack, pinion, and ball constituting a sensible means to indicate the number of teeth of said rack traversed.

2. A camera for taking sequential exposures of objects on a single film plate, which objectives appear on an oscilloscope face comprising a case for said camera securely mountable upon the face of the oscilloscope, said camera having a monomanual vertically movable lens within said case, an image plate rigidly mounted upon the case, a rack and pinion for adjustably positioning the lens along the length of the vertical movement thereof, means securing said rack and pinion to said camera, and a spring biased means for engaging the rack and holding the rack in position so that the lens is maintained in a predetermined vertical position, said rack, pinion, and ball constituting a sensible means to indicate the number of teeth of said rack traverse.

3. The camera according to claim 2 wherein means is provided to allow the objectives on the oscilloscope to be observed by an operator, and means to shut-off said means of observing the oscilloscope so that exposures of the objectives may be made on said plate.

4. In a camera for taking sequential exposures of objects appearing on a face of an oscilloscope, a casing substantially enclosing said camera secured onto the oscilloscope so that the camera is positioned for receiving on the plate thereof the images of the objects provided by the oscilloscope, said camera having a monomanual vertically movable lens and movable with respect to the casing, a rack secured to the lens, and a pinion mounted with respect to the casing for engaging the teeth of the rack so that as the pinion is turned, the lens may move vertically in response thereto, means securing said rack and pinion to said camera, and said rack and pinion having a spring-biased engaging means constituting a sensible means to indicate which of said predetermined positions is traversed, said spring-biased engaging means mounted securely with respect to the casing for maintaining the movable lens in one of several predetermined vertical positions.

5. The camera according to claim 4, wherein the spring-biased rack engaging means is a securely mounted resilient plate having a ball-shaped device secured to its free end for engaging the space between the teeth of the rack.

References Cited in the file of this patent

UNITED STATES PATENTS

| | | |
|---|---|---|
| 716,108 | Robertson et al. | Dec. 16, 1902 |
| 2,085,088 | Engstrom | June 29, 1937 |
| 2,633,403 | Spaulding | Mar. 31, 1953 |
| 2,688,898 | Caps | Sept. 14, 1954 |
| 2,751,275 | Mansberg | June 19, 1956 |